UNITED STATES PATENT OFFICE.

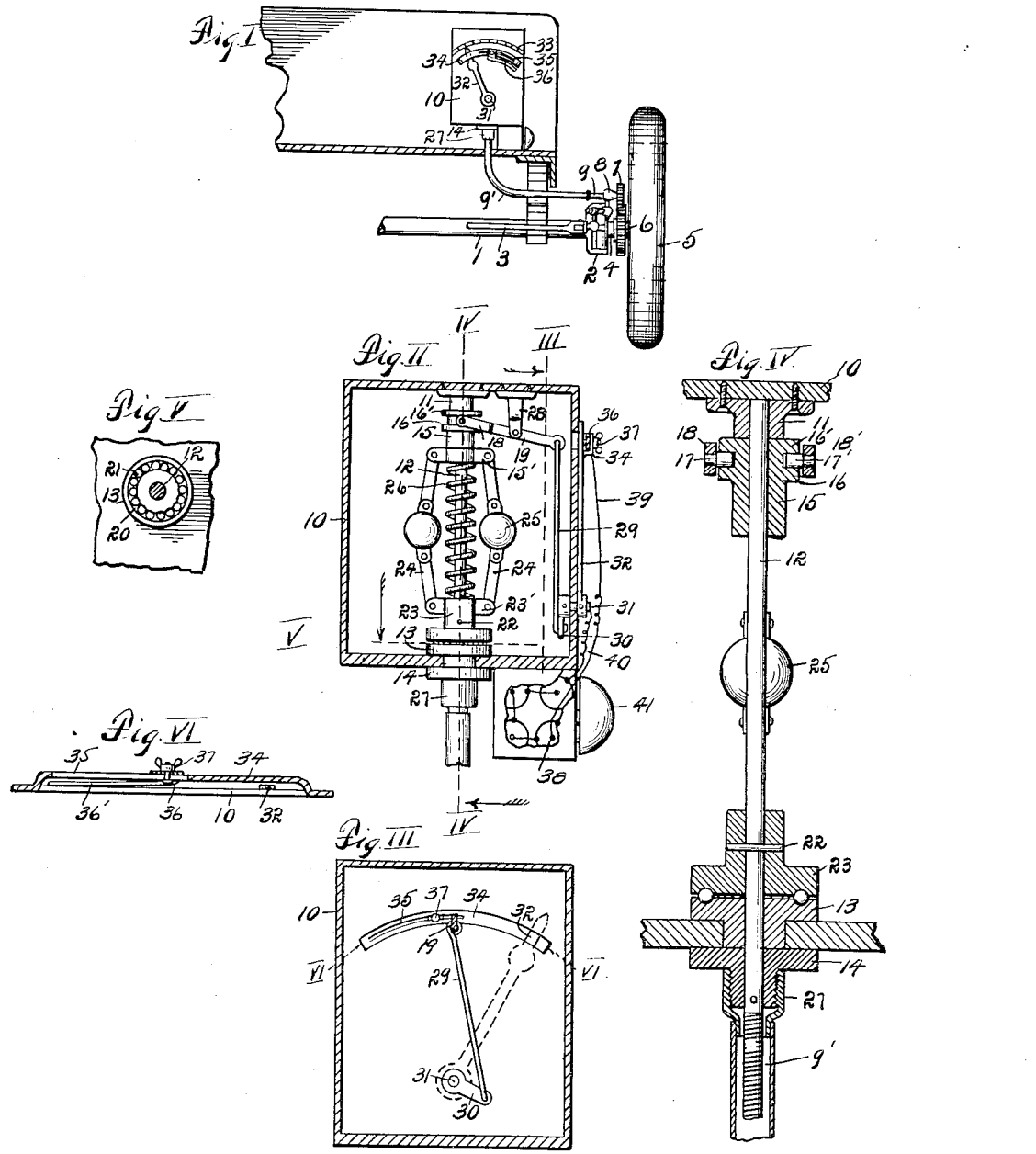

SYLVESTER C. DE FORE, OF KANSAS CITY, MISSOURI, ASSIGNOR TO STANDARD SPEEDOMETER COMPANY, A CORPORATION OF MISSOURI.

SPEED-INDICATING DEVICE.

No. 877,176.   Specification of Letters Patent.   Patented Jan. 21, 1908.

Application filed May 11, 1907. Serial No. 373,136

*To all whom it may concern:*

Be it known that I, SYLVESTER C. DE FORE, a citizen of the United States, residing at Kansas City, in the county of Jackson and State of Missouri, have invented certain new and useful Improvements in Speed-Indicating Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to a speed indicating device, and has for its object to provide a device of that class for use with automobiles or like vehicles, by which the speed of the vehicle may be indicated at all times during its travel, and which may be set to give an alarm when the vehicle has reached a predetermined speed.

A further object is to provide the improved details of structure which will presently be fully described and pointed out in the claims.

In the drawings forming part of this specification,—Figure I is a view of a portion of the running gear and front board of an automobile showing the application of my device thereto. Fig. II is a vertical section through the casing containing the operating parts. Fig. III is a view in vertical section on the line III—III, Fig. II. Fig. IV is a similar view of the governor mechanism on the line IV—IV, Fig. II. Fig. V is a plan view on the line V—V, Fig. II. Fig. VI is a sectional view on the line VI—VI, Fig. III.

Referring more in detail to the parts,—1 represents the front axle of an automobile, having a knuckle mechanism 2, and a steering rod 3 of any ordinary construction.

On the short axle 4, carrying the front wheel 5 is a spur wheel 6, and meshing with wheel 6 is a pinion 7, having a revoluble shaft 9 carried by a bracket 8, and connected with said revoluble shaft is a flexible shaft 9'.

10 is a casing carried on the front board of the vehicle. Journaled in a bracket 11, depending from and rigidly secured to the top of casing 10 is a shaft 12, which shaft projects through the collars 13 and 14 which are rigidly secured to the bottom of box 10. Loosely mounted on shaft 12 is a sleeve 15, having a peripheral groove formed by the flanges 16—16', within which pins 17—17' on the yoke 18—18' of a lever 19 are adapted to travel. In the top of collar 13 is a ball race 20, in which are seated a number of bearing balls 21; and fitting over race 20 and rigidly secured to shaft 12, by means of a pin 22 is a sleeve 23 having a downwardly facing ball race registering with the race in sleeve 13, and adapted to support the shaft and parts on the bearing balls 21. Projecting laterally from each side of sleeves 15 and 23 are the yoke arms 15' and 23' in which are pivotally mounted the governor arms 24, such arms being jointed, and supporting the balls 25.

Surrounding shaft 12, and bearing against the bottom of bracket 15 and the top of bracket 23 is a compression spring 26 adapted to normally retain the governor arms 24 in substantially a vertical position.

Shaft 12 projects beyond collar 14 and rigidly secured to such projecting end is the flexible shaft 9', the jacket of which is attached to the neck of collar 14 by means of a swivel 27.

The lever 19 is pivoted in a bracket 28, carried on casing 10, and carries at its free end a link 29, which is connected with a crank arm 30. Arm 30 is rigidly secured on a pin 31, which extends through and is journaled in the front plate of casing 10. Rigidly secured on the front end of pin 31 is an indicator arm 32, which extends upwardly to a scale 33, carried on the front of the casing.

Between the scale 33 and pin 31 is a raised bracket 34, having a longitudinal slot 35, and carried by said bracket is a contact head 36 of a suitable conductive material; said head having a threaded perforation adapted to receive a thumb screw 37, which projects through slot 35, and binds said strip in a suitable position in relation to scale 33.

36' is a finger on head 36 which projects in the direction of the increasing scale numerals.

38 is a battery mounted adjacent to the casing, and 39 is a lead wire leading to head 36, and 40 is a lead wire connected with the pin 31, carrying the indicator arm.

41 is a bell adapted for operation when a circuit is completed through the indicator arm and contact head.

When in operation the flexible shaft is revolved through the geared connection with the front wheel and the governor arms carried around at a speed proportionate to the speed of travel of the vehicle. As the speed increases, the centrifugal force carries the governor balls outwardly, away from the governor shaft. The lower collar being rigid on shaft 12, the centrifugal action tends to draw the upper collar downwardly against the tension of spring 26, such action rocking lever 19, and turning pin 31 through the link connection. As pin 31 is turned, it carries the indicator arm along the scale to indicate the speed per hour at which the vehicle is traveling, the parts having been previously adjusted for this purpose.

If it is desired to give an alarm when the vehicle has attained a certain speed, the contact head 36 is set for that speed so that when the indicator arm has reached the point on the scale indicating such speed, it will contact with head 36 and complete the circuit, causing the ringing of the bell.

By providing the head with the extension, as shown, the indicator arm retains its contact therewith and causes a continued ringing of the bell, should the indicated speed be exceeded and until the speed of the vehicle has been reduced below the alarm point.

The alarm part of my invention is especially useful in cities having a speed limit, or in testing machines to determine whether or not they are capable of attaining a certain speed.

Having thus described my invention, what I claim as new therein, and desire to secure by Letters Patent is,—

In a speed indicating device, the combination of a suitable casing provided with a scale, a bell, a raised bracket adjacent to said scale, and having a longitudinal slot therein, a contact head, a set screw extending through said slot, and supporting said head between the bracket and casing, a crank shaft, an indicator arm rigid on said shaft and projecting beneath said bracket, and means for completing a circuit through said indicator arm, and head to energize said bell, for the purpose set forth.

In testimony whereof I affix my signature in presence of two witnesses.

SYLVESTER C. DE FORE.

Witnesses:
 B. E. DAVIS,
 W. B. DAVIS.